US006957797B1

(12) United States Patent
Strobel

(10) Patent No.: US 6,957,797 B1
(45) Date of Patent: Oct. 25, 2005

(54) PICTURE PLACER DEVICE

(76) Inventor: John W. Strobel, 120 Shadow Creek Chase, Alpharetta, GA (US) 30022

( * ) Notice: Subject to any disclaimer, the term of this patent is extended or adjusted under 35 U.S.C. 154(b) by 0 days.

(21) Appl. No.: 10/819,322

(22) Filed: Apr. 6, 2004

(51) Int. Cl.[7] ............................ A47G 1/24; B60R 1/02
(52) U.S. Cl. ...................................... 248/477; 248/476
(58) Field of Search ............................... 248/476, 477, 248/488, 495–498; 40/713; 33/613

(56) References Cited

U.S. PATENT DOCUMENTS

| | | | | |
|---|---|---|---|---|
| 4,753,014 A | * | 6/1988 | Vrajich | 33/613 |
| 5,471,760 A | * | 12/1995 | Farris | 33/613 |
| 5,867,917 A | * | 2/1999 | Karon | 33/613 |
| 6,032,378 A | * | 3/2000 | Null | 33/613 |
| 6,185,831 B1 | * | 2/2001 | Pluciennik | 33/613 |
| 6,739,065 B2 | * | 5/2004 | Hofmeister et al. | 33/613 |
| 2004/0177527 A1 | * | 9/2004 | Prevost | 33/613 |

* cited by examiner

*Primary Examiner*—Kimberly Wood
*Assistant Examiner*—Amy J. Sterling
(74) *Attorney, Agent, or Firm*—George Ronald Reardon

(57) ABSTRACT

A device and method for locating the point on a wall at which a nail, or other wire suspending element, is to be installed for the hanging of pictures and the like. The device includes a retrieval arm operable for engaging the framing wire of a picture and a wall striking element operable for marking on a wall the place for a nail or other hardware to be secured. The device also includes a flanged assembly operable for receiving the retrieval arm and selectively engaging and disengaging the retrieval arm. The flanged assembly is disposed for promotional information or attachments.

3 Claims, 9 Drawing Sheets

PICTURE PLACER DEVICE

BACKGROUND OF THE INVENTION

The present invention relates to wall-marking devices which facilitate the installation of pictures, artwork, mirrors, and other wall-mounted articles, particularly where such articles are supported from behind by a catch such as a wire or cord. Also, the present invention relates to a method of marking the wall at the proper site for the hanging device, in order that the frame of the hanging device will hang in the precise position desired, while being centered and level, all while allowing both hands to be free to hold the artwork. Additionally, the present invention relates to the provision of the display of promotional information, whether in the form of text, color, shapes, logos and the like.

Hanging a picture and other wall hangings has traditionally been an imprecise, awkward and frustrating procedure for most people, particularly when the elements supporting the picture are concealed by the picture itself. When multiple people are involved or multiple pictures are to be hung in precise alignment to each other, the anxiety level increases, sometimes to the level of generating angry outbursts. Someone wanting to hang a picture, or other hanging device, first holds the frame in the desired mounting position, then attempts to locate the correct location for installation, generally with a finger, then removes the hanging device, and, finally, marks the location with a pencil.

Since the result of this traditional method is the marking of the approximate location where the nail, or similar hardware, should be secured to the wall, frequently the person hanging the picture has to reposition the nail, sometimes more than once, in order to get the desired result. This repositioning generally results in multiple disfiguring marks or holes on the wall, either from the pencil, the nail, or both. Some of these marks may be visible once the picture is positioned. The disfiguring marks then may require repair, possibly including touchup paint.

Previous attempts to provide for the locating of the precise location for the nail, or other supporting device, include the following. U.S. Pat. No. 3,516,165, issued to Pfeffer, teaches using a flat thin bar having a picture supporting element and a wall marking element. U.S. Pat. No. 5,471,760, issued to Farris, teaches a sliding member with one or more hooks and a spirit level. U.S. Pat. No. 5,867,917, issued to Karon, teaches using a cord tensioning member that terminates with both a wall marking device and a hook member. U.S. Pat. No. 6,000,142, issued to Deaton, teaches using a block with a slot for the wire and a protrusion for marking the wall, with the block attached to a spring and the spring attached to a U-shaped member that is positioned on the top of the picture frame. U.S. Pat. No. 6,185,831, issued to Pluciennik, teaches using a threaded block operable to receive an L-shaped stem to engage the picture hanging wire, where the L-shaped stem terminates in a point for marking the wall. U.S. Pat. No. 6,286,803, issued to Pellino, teaches a J-shaped device with a bubble level at the top, an adjustable vertical component with a marking protrusion towards the bottom of the vertical component.

While these patents and other previous methods have attempted to solve the problem of marking the wall to facilitate the proper hanging of pictures and the like, none have employed an imprintable front flange, disposed for promotional purposes, a flexible shape-changeable finger-grip loop and a centering window. Additionally, prior inventions such as that disclosed by the Deaton patent, are not lockable and have limited adjustability.

Therefore, a need exists for an improved picture hanging device that can take the guesswork out of picture hanging; that can allow companies to personalize the product for advertising purposes; that is easier to use, and that can allow both hands to be free to hold the picture against the wall.

The foregoing patent and other information reflect the state of the art of which the inventor is aware and are tendered with a view toward discharging the inventor's acknowledged duty of candor in disclosing information that may be pertinent to the patentability of the present invention. It is respectfully stipulated, however, that the foregoing patent and other information do not teach or render obvious, singly or when considered in combination, the inventor's claimed invention.

BRIEF SUMMARY OF THE INVENTION

The general purpose of the present invention, which will be described subsequently in greater detail, is to provide a new method and device for effectively and efficiently hanging pictures and the like, while also providing a platform for promotional purposes. The present invention is intended to be used when the picture or art-work to be hung has a picture frame hanging wire secured on both sides of the back of a picture frame. The present invention is not intended for use for picture frames with only a small "saw-tooth" bracket attached to the top of the frame for hanging.

One objective of the present invention is to provide a device that will accurately mark the wall for the placement of a nail or other hanging hardware.

Another objective of the present invention is to provide a device that is inexpensive.

Another objective of the present invention is to provide a device that is easy to use.

Another objective of the present invention is to provide a device that can be reused many times.

Another objective of the present invention is to provide a device that will allow both hands to be free to hold the artwork against the wall.

Another objective of the present invention is to provide a device that is disposed for displaying promotional or other identification type of information.

Another object of this invention is to provide a picture hanging device which uses simple materials and components.

Another objective of the present invention is to provide a method for hanging pictures and the like that takes the guesswork out of picture hanging.

Another objective of the present invention is to provide adjustability for engaging the framing wire in a range from within one inch of the top of the frame to 10 inches from the top of the frame.

Another objective of the present invention is to provide for locking the invention in the desired position after engaging the framing wire and pulling it to the desired height.

The basis for the present invention is centered on a generally V-shaped part having an imprintable front flange and a back flange that is operable for slideably engaging a wire retrieval arm, wherein the wire retrieval arm is operable for engaging the back flange, operable for engaging framing wire and operable for wall-marking.

The present invention is comprised of a retrieval arm that is operable for engaging the framing wire on the back of a picture, is further operable for marking the wall and further operable for slideable, releasable locking. The present invention is further comprised of a generally V-shaped part that has a front flange and a back flange, wherein the front flange is disposed for promotional purposes; the back flange is operable for receiving the retrieval arm, and is further operable for selectively engaging and disengaging the retrieval arm via pressure exerted on the connected front flange.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Further objects and advantages of the present invention will be apparent from the following detailed description of a presently preferred embodiment which is illustrated schematically in the accompanying drawings.

BRIEF DESCRIPTION OF THE SEVERAL VIEWS OF THE DRAWING

Other advantages and features of the invention are described with reference to exemplary embodiments, which are intended to explain and not to limit the invention, and are illustrated in the drawings in which.

DETAILED DESCRIPTION OF THE INVENTION

Figure 1:
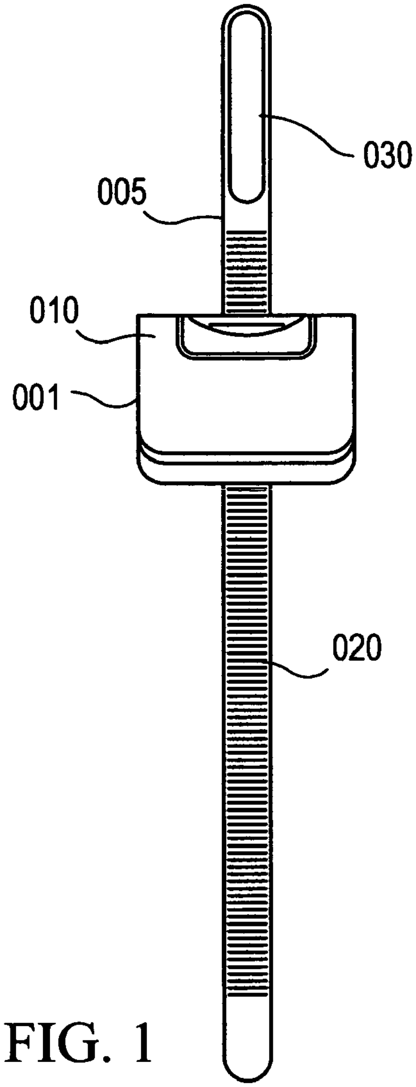
FIG. 1 is a front view of the invention.
Figure 2:
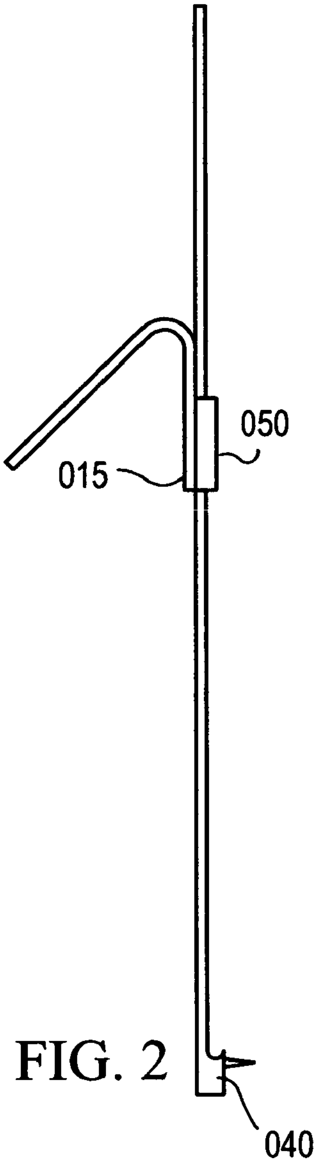
FIG. 2 is a left side view of the invention.
Figure 3:
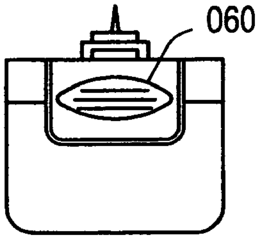
FIG. 3 is a top view of the invention.
Figure 4:
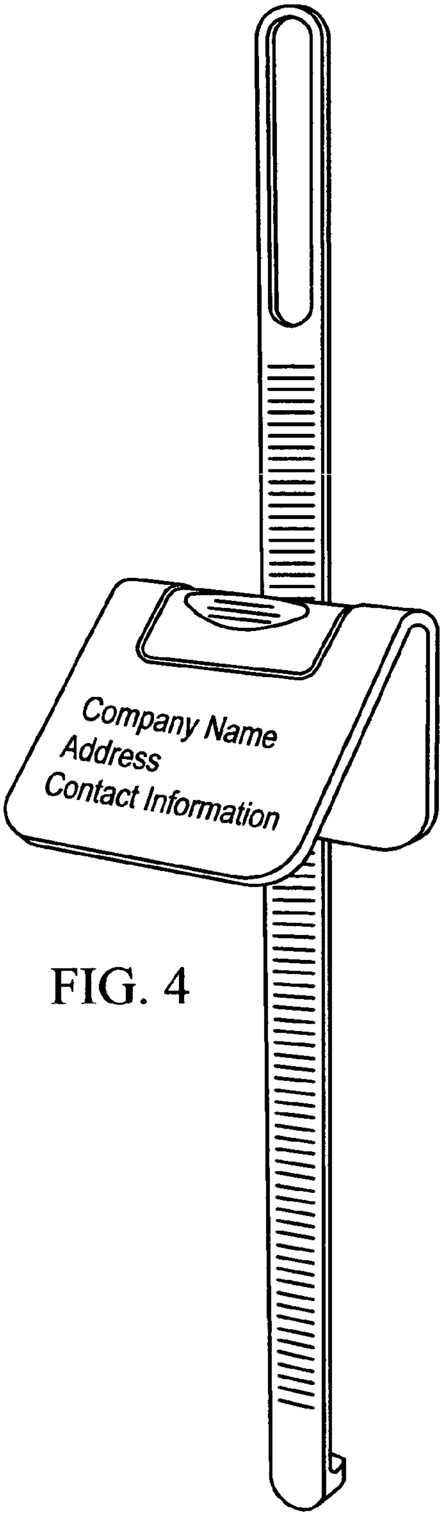
FIG. 4 is a front perspective view of the invention.
Figure 5:
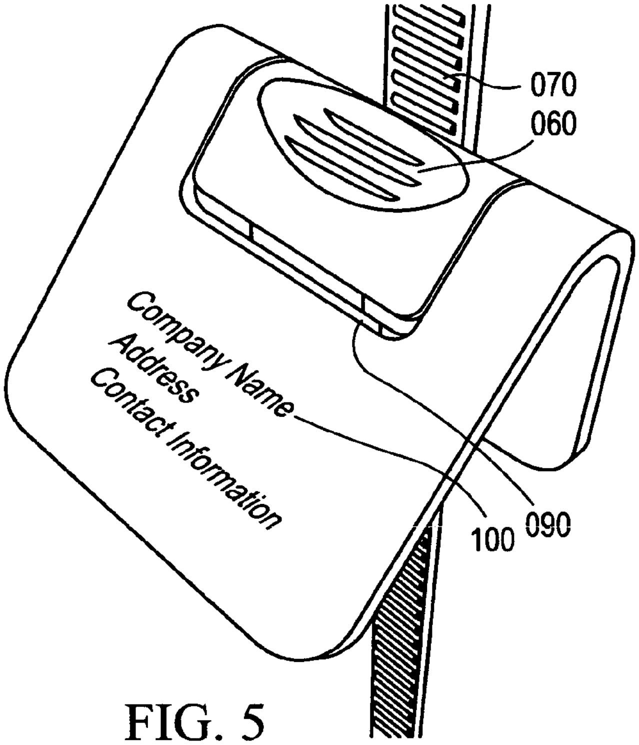
FIG. 5 is a partial front perspective view of the invention showing detail.
Figure 6:
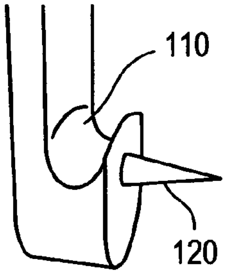
FIG. 6 is a partial left side perspective view of the invention showing detail of the bottom portion of the wire retrieval arm.
Figure 7:
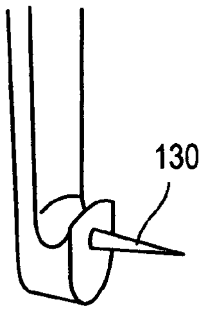
FIG. 7 is a partial left side perspective view of the invention showing detail of another embodiment of the bottom portion of the wire retrieval arm.
Figure 9:
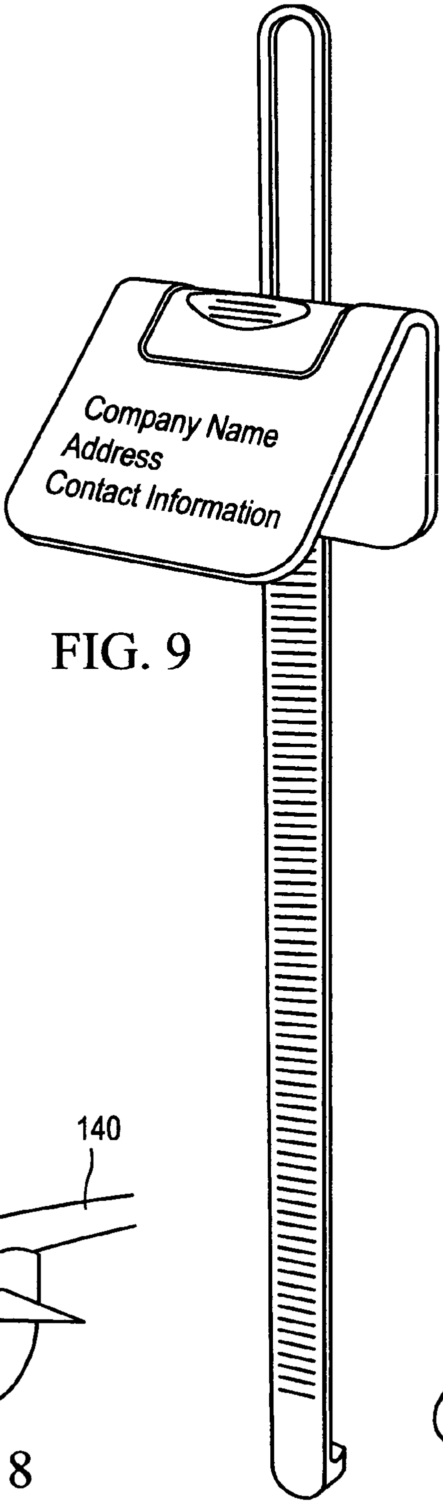
FIG. 9 is a front perspective view of the invention, showing the flanged portion in the topmost position.
Figure 10:
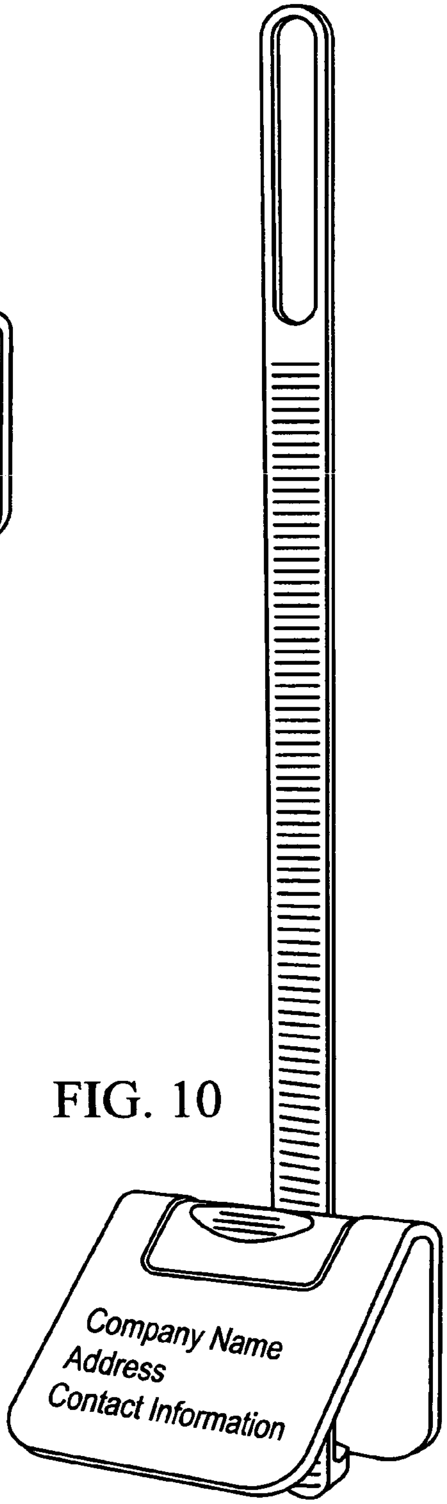
FIG. 10 is a front perspective view of the invention, showing the flanged portion in the bottommost position.
Figure 8:
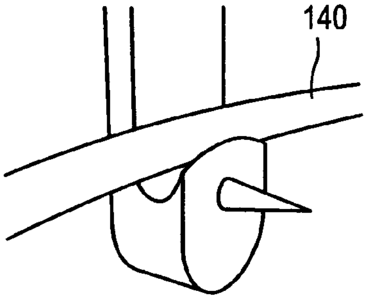
FIG. 8 is a partial left side perspective view of the invention showing the engaging of the frame wire.
Figure 11:
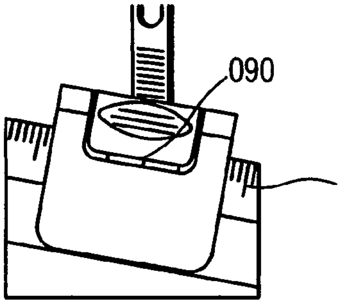
FIG. 11 is a partial front view of the invention, showing the use of measuring tape.
Figure 13:
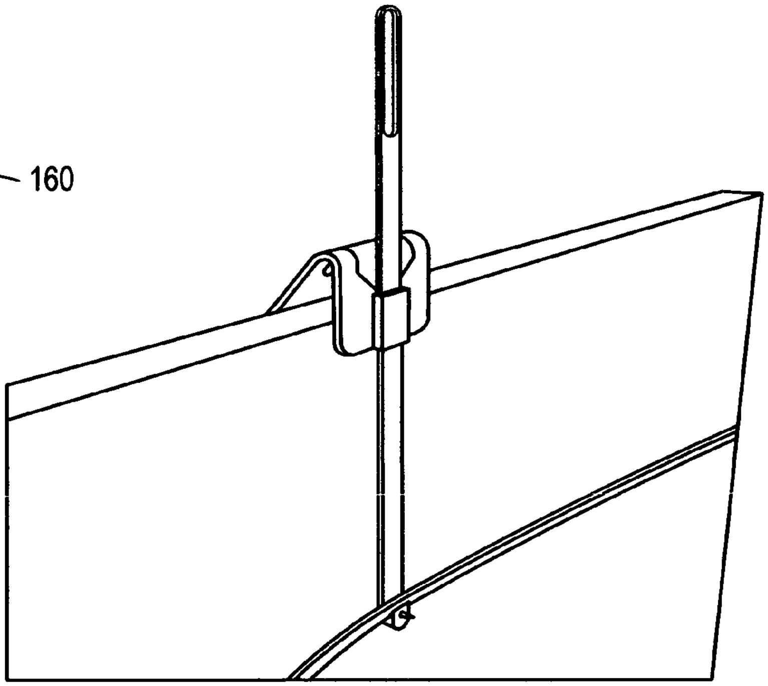
FIG. 13 is a back perspective view of the invention, showing the wire retrieval arm engaging the frame wire at the back of a picture.
Figure 12:
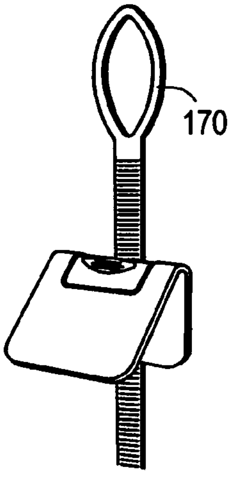
FIG. 12 is a partial front perspective view of the invention, showing the finger loop ready for insertion of the User's finger.
Figure 14:
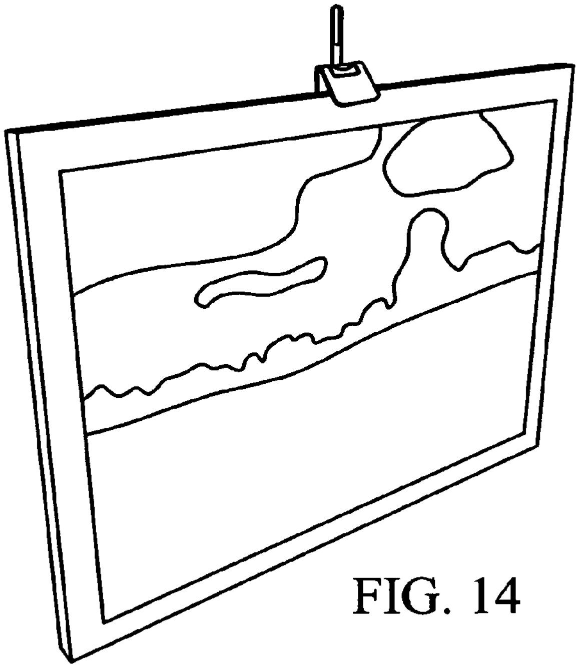
FIG. 14 is a front perspective view of the invention, showing how the invention appears in use from the front side of the picture.
Figure 15:
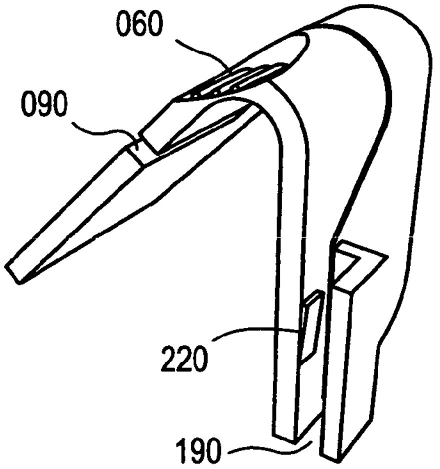
FIG. 15 is a back perspective view, showing detail of the front and back flanges.
Figure 16:
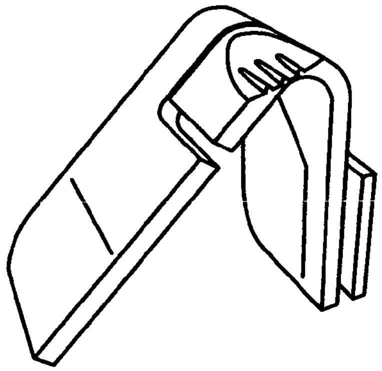
FIG. 16 is a front perspective view, showing detail of the front and back flanges.
Figure 17:
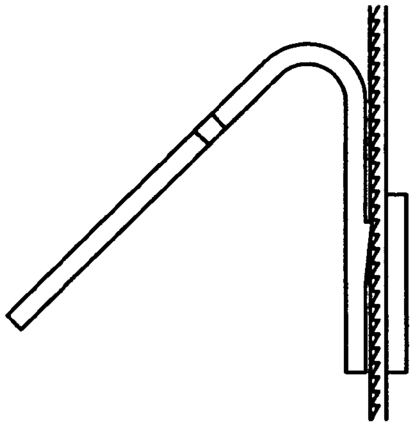
FIG. 17 is a left side view of the front flange, the back flange and the wire retrieval arm in the locked position.
Figure 18:
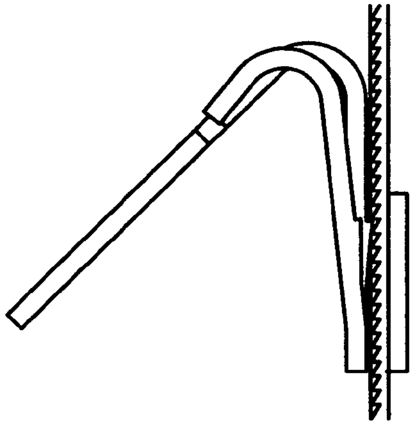
FIG. 18 is a left side view of the front, flange, the back flange and the wire retrieval arm in the unlocked position.
Figure 19:
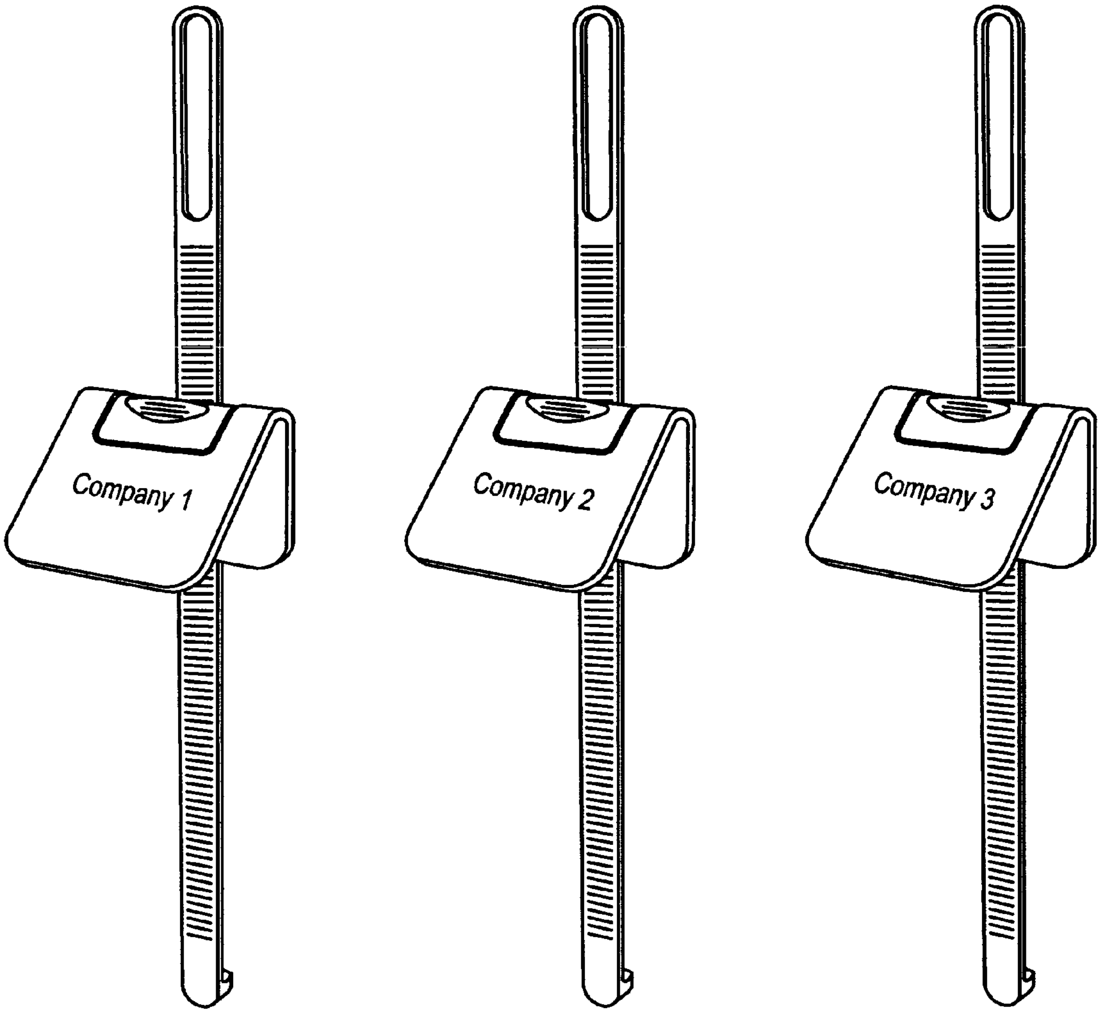
FIG. 19 is a front perspective view, showing promotional information for different companies.
Figure 20:
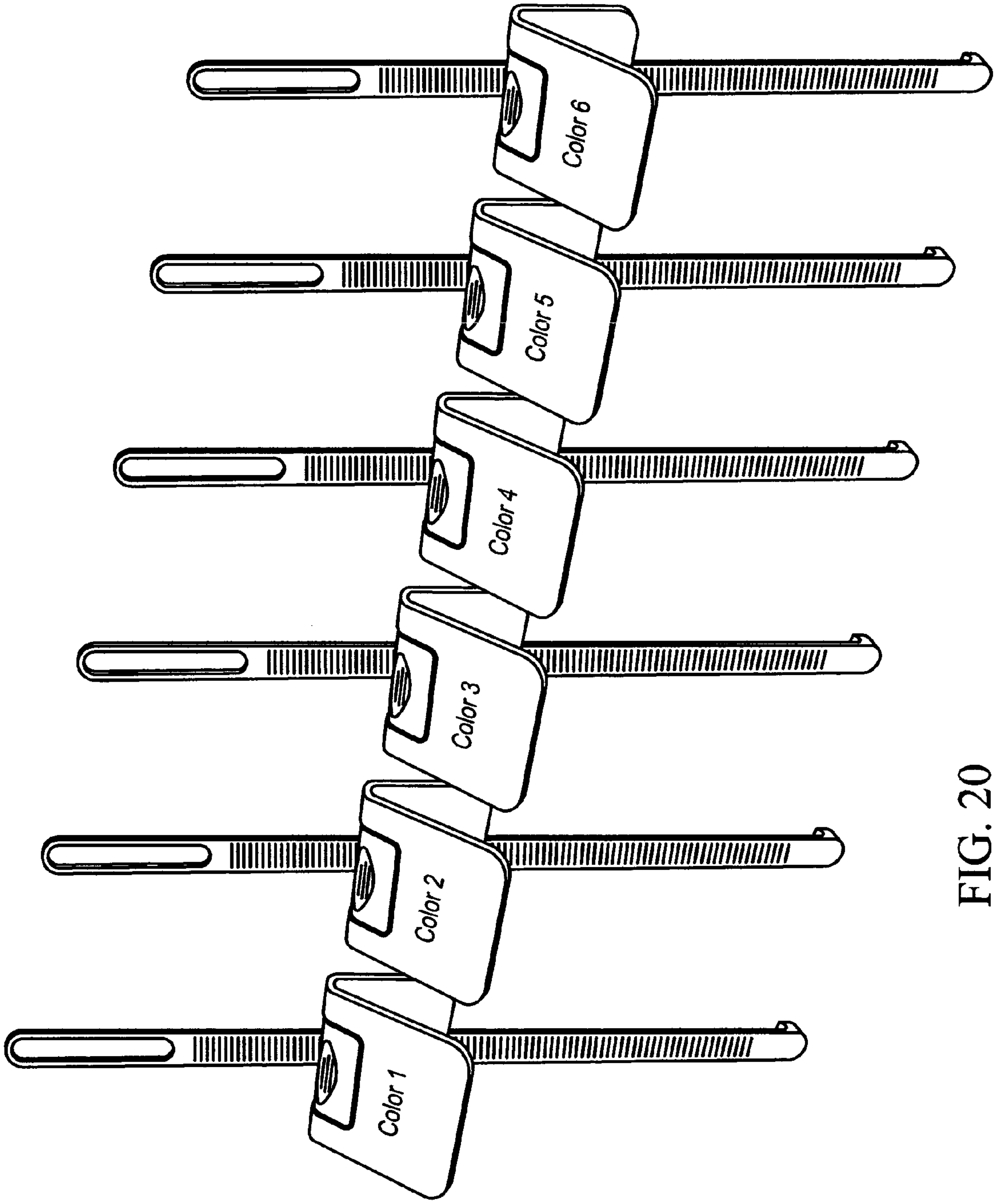
FIG. 20 is a front perspective view, showing the use of different colors for the invention.
Figure 21:
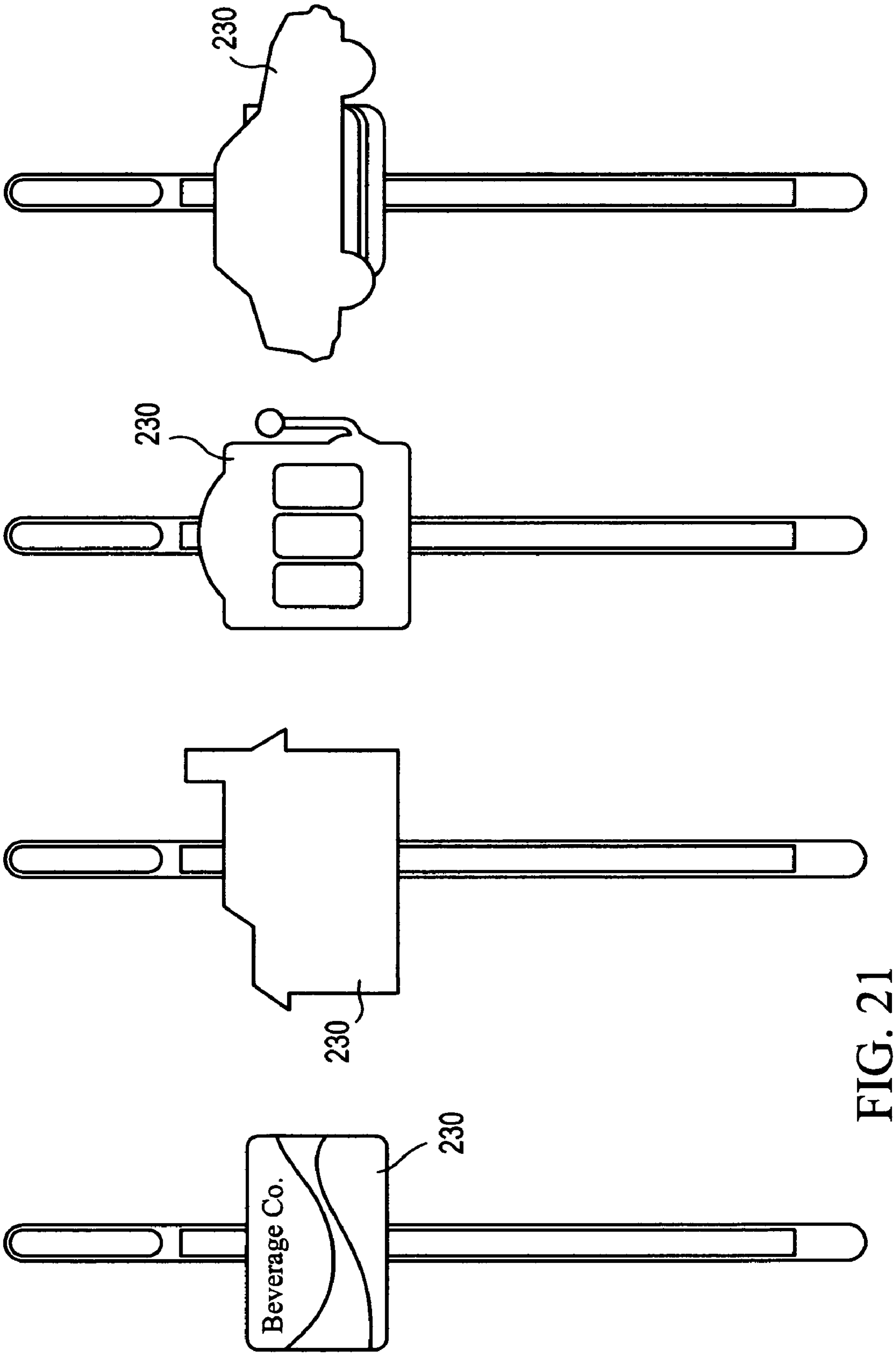
FIG. 21 is a front view, showing the use of different shapes and logos on the front flange.
Figure 22:
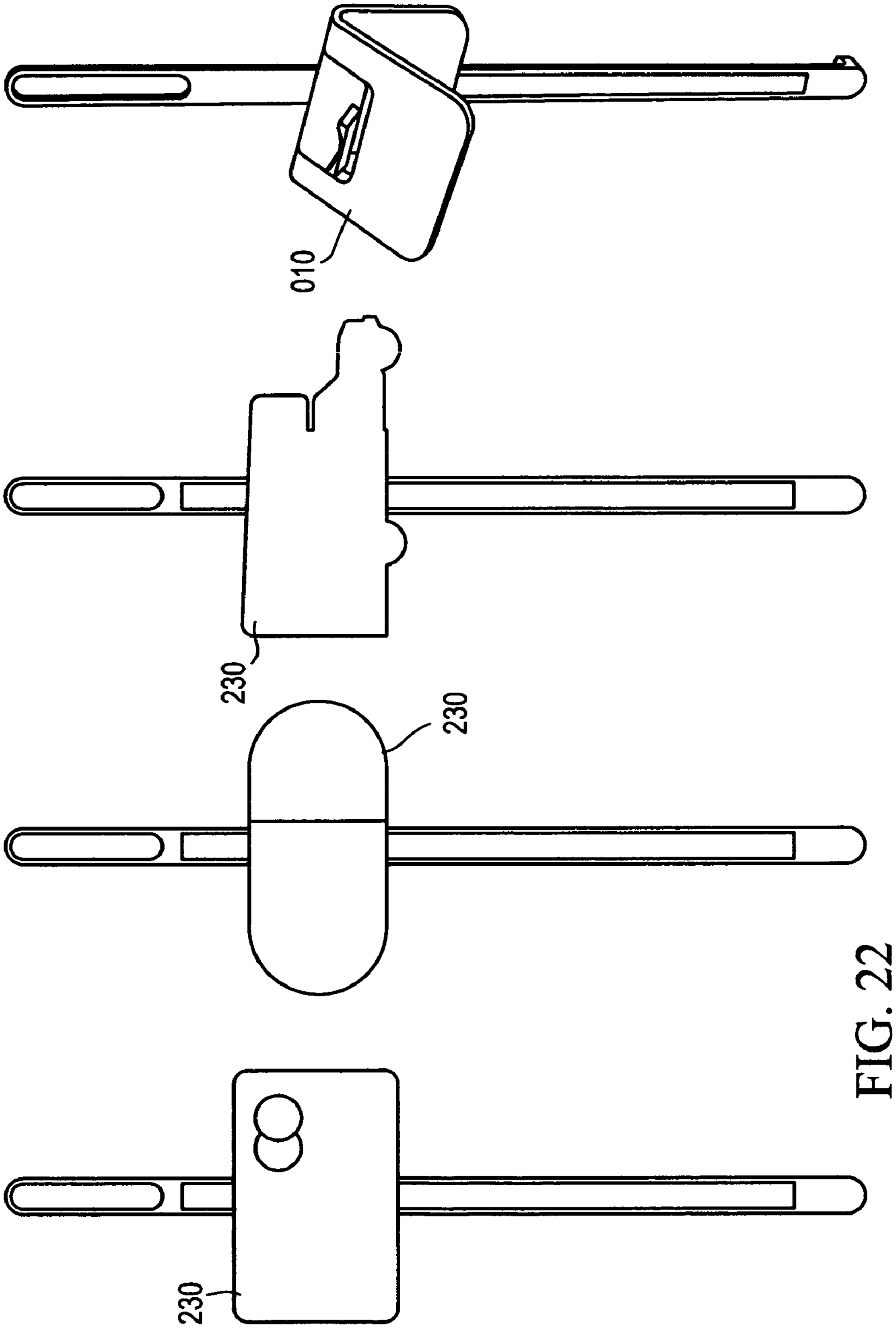
FIG. 22 is a front view, showing the use of different shapes and logos on the front flange.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The preferred embodiment of the present invention is comprised of the following. The wire retrieval arm, 005, is further comprised of a finger grip loop, 030, retrieval arm teeth, 020, disposed on the front side of the wire retrieval arm, 005, a hook and marking assembly, 040, at the bottom of the wire retrieval arm, 005, with the hook and marking assembly, 040, disposed on the back side of the wire retrieval arm, 005, opposite of the retrieval arm teeth, 020. The hook and marking assembly, 040, is further comprised of a wire retrieval arm hook, 110, and a wall marking appendage, 120. The present invention is further comprised of a flanged assembly, 001, which is further comprised of a front flange, 010, and a back flange, 015. The front flange is further comprised of a finger pressure pad, 060, a centering window, 090, and a promotional area, 100. The back flange, 015, is further comprised of a retrieval arm lock, 220, a retrieval arm channel assembly, 050, which forms a retrieval arm channel, 190. In the preferred embodiment the wire retrieval arm, 005, and the flanged assembly, 001, are molded from plastic.

In another embodiment of the invention, the molded wall marking appendage, 120, is replaced by an inserted wall marking appendage, 130, made from a non-plastic material, for example, metal, steel, aluminum, etc.

In another embodiment of the invention, a logo attachment, 230, is affixed or releasably attached to the front flange, 010, covering the promotional area, 100.

The preferred embodiment of the invention is assembled by the User as follows. The wire retrieval arm, 005, is inserted into the retrieval arm channel, 050, such that the finger-grip loop, 030, is inserted first into the retrieval arm channel, 050, with the retrieval arm teeth, 020, facing the retrieval arm lock, 220, and the molded wall marking appendage, 120, pointing in the opposite direction of the promotional side of the front flange, 010. Once the retrieval arm, 005, is inserted into the retrieval arm channel, 050, the User pulls the retrieval arm, 005, using the finger-grip loop, 030, until at least one of the retrieval arm teeth, 020, engage the retrieval arm lock, 220. The device is now ready to be used.

The preferred method of using the invention is comprised of the following steps.

1. Determine the center of the frame by using a tape measure or by visual adjustment. If a mark is made on the top of the frame indicating the center point, or a tape measure, 160, is used, the User can look through the centering window, 150, to determine when the device is centered.
2. Attach the invention over the top and center of the picture frame with the wire retrieval arm, 005, hanging over the back of the picture.
3. Using the finger-grip loop, 030, on the wire retrieval arm, 005, pull up on the wire retrieval arm, 005, and allow the wire retrieval arm hook, 110, to catch the framing wire, 140.
4. Pull the wire retrieval arm, 005, until the framing wire, 140, is taut. This will secure the invention to the frame and allow for the next step.
5. With the backside of the picture against the wall, the User positions the picture in the desired position and gently pushes on the front of the picture. The wall marking appendage, 120, will leave a small mark in the wall at the precise position to place the picture hanging hook.
6. A nail or other wall-hanging hardware can then be secured to the wall at the place that has been marked, and the picture hung on the wall on that nail.

I claim:

1. A picture hanging locating device, for locating a picture, or other object, on a wall, at any location on said wall, wherein said picture employs a wire, or string mounting arrangement, comprising:

a wire retrieval arm and a flanged assembly;

wherein the wire retrieval arm has a front side, a back side, a top and a bottom and is further comprised of a finger grip loop on said top side, retrieval arm teeth disposed on a portion of said front side, and a wire retrieval hook and a wall marking appendage disposed on said back side at said bottom;

wherein said flanged assembly has a front flange and a back flange;

wherein said front flange is further comprised of a finger pressure pad, a centering window and a promotional area; and, wherein said back flange is further comprised of a retrieval arm lock and a retrieval arm channel assembly.

2. The device of claim 1, wherein a logo attachment is affixed to said promotional area.

3. The device of claim 1, wherein the wall marking appendage is made of metal.

* * * * *